Dec. 27, 1960 S. R. OVSHINSKY 2,966,567

CIRCUIT CONTROL DEVICES

Filed Nov. 15, 1957 4 Sheets-Sheet 1

INVENTOR.
Stanford R. Ovshinsky

BY
Harness, Dickey & Pierce
ATTORNEYS.

INVENTOR.
Stanford R. Ovshinsky
BY
Harness, Dickey & Pierce.
ATTORNEYS.

Dec. 27, 1960 S. R. OVSHINSKY 2,966,567
CIRCUIT CONTROL DEVICES
Filed Nov. 15, 1957 4 Sheets-Sheet 3
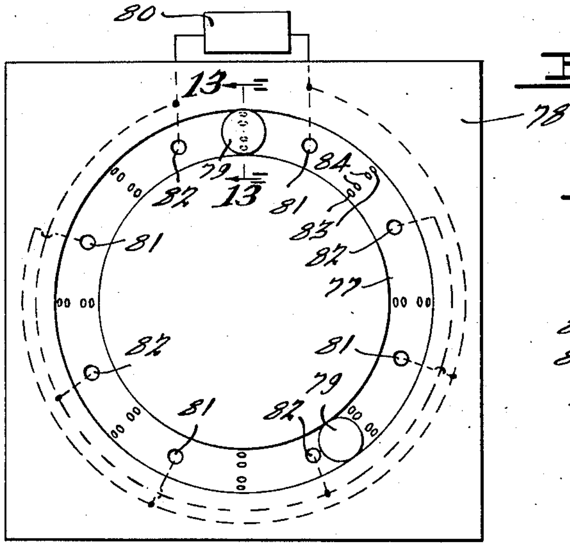
FIG. 12.
FIG. 13.
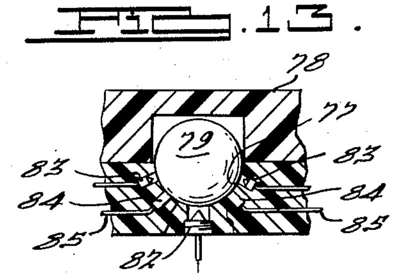
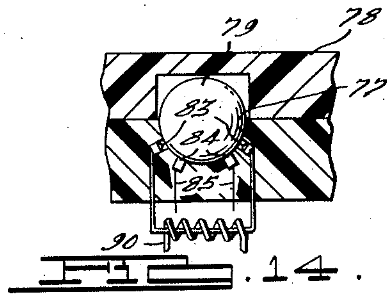
FIG. 14.
FIG. 15
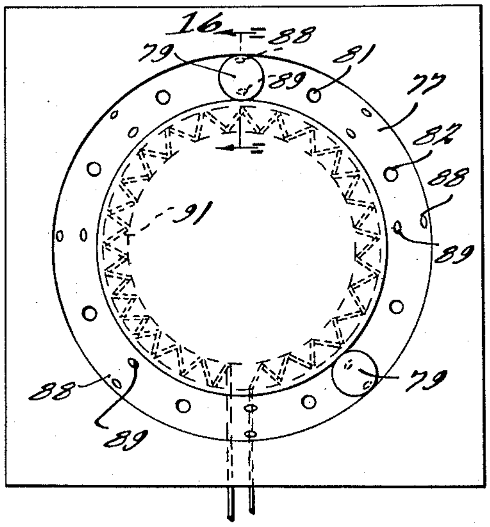
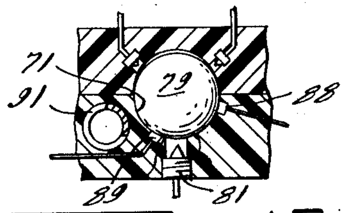
FIG. 16.
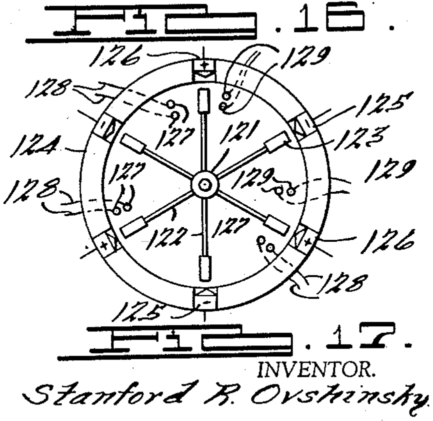
FIG. 17.
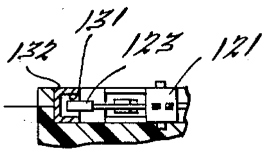
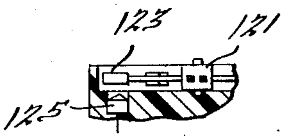
FIG. 18. FIG. 19
INVENTOR.
Stanford R. Ovshinsky
BY
Harness, Dickey & Pierce
ATTORNEYS.

INVENTOR.
Stanford R. Ovshinsky
BY
Harness, Dickey & Pierce
ATTORNEYS 2,966,567
Patented Dec. 27, 1960

2,966,567

CIRCUIT CONTROL DEVICES

Stanford R. Ovshinsky, Detroit, Mich., assignor to Tann Corporation, Detroit, Mich., a corporation of Michigan Filed Nov. 15, 1957, Ser. No. 696,644
20 Claims. (Cl. 200—87)

This invention relates to circuit control devices, and particularly to devices which make and break circuits in the presence of predetermined forces.

The device of the present invention employs a high potential voltage across a path in which a ball is movable for the purpose of producing the reciprocation of the ball therein. Contacts may be provided at one or both ends of the path and intermediate the ends so that circuits can be made and broken as the ball reciprocates. Holding means may be provided adjacent to the contacts for stopping the ball and retaining it bridged across the contacts to thereby complete and maintain a circuit. Such means may be terminals or a high potential voltage which will act upon the ball or may be pole pieces associated with a coil which produce a magnetic flux to stop and retain the ball when the ball is made of magnetizable material. A pair of paths may be employed, with a ball in each path, one controlled by a high potential voltage and the other controlled by a magnetic flux so that by the application of voltage and flux signals to the balls a circuit will be completed. One of the balls may be maintained against one contact by the magnetic flux; the other ball may be maintained adjacent to the other contact by the high potential field, in which positions both balls are in engagement with the contacts and with each other to complete the circuit. Not only is the ball capable of operating in reciprocation in a straight path but it may also be employed at an annular path driven therealong by the high potential fields produced by spaced electrodes of alternate polarity. Contacts may be provided in the annular path which will be bridged by the ball to complete a circuit for an instant as the ball passes thereover. By employing electrodes and magnetizable pole pieces adjacent to the contacts, the ball may be stopped to maintain the circuit completed for any desired length of time.

Accordingly, the main objects of the invention are: to provide a control device by which electric circuits are made through the movement of a ball in a straight or annular path; to produce the movement of the ball in a path by a high potential voltage which is discharged along the path; to provide spaced contacts along the path in which a ball moves and which are bridged thereby to complete a circuit; to employ a pair of balls which are capable of engaging a pair of contacts when in engagement with each other to complete a circuit in response to predetermined signals; to provide an annular path for one or a plurality of balls which are moved therealong by the discharge of high potential voltage from alternate electrodes of different polarity which controls the speed of movement of the ball and the stopping of the ball or balls for making and breaking circuits in response to predetermined signals embodying high voltage and magnetic fields, and, in general, to provide a control device for electric circuits which is simple in construction, positive in operation and economical of manufacture.

Other objects and features of novelty of the invention will be specifically pointed out or will become apparent when referring, for a better understanding of the invention, to the following description taken in conjunction with the accompanying drawings, wherein:

Fig. 12 is a view of a device, similar to that illustrated in Fig. 11, employing an annular rather than a reciprocatory path for the ball;

Fig. 13 is an enlarged sectional view of the structure illustrated in Fig. 12, taken on the line 13—13 thereof;

Fig. 14 is a view of structure, similar to that illustrated in Fig. 13, showing another form thereof;

Fig. 15 is a plan view of a device, similar to that illustrated in Fig. 12, in which a plurality of balls are employed;

Fig. 16 is an enlarged sectional view of the structure illustrated in Fig. 15, taken on the line 16—16 thereof;

Fig. 17 is a view in elevation of a device which rotates when a proper field is applied thereto;

Fig. 18 is an enlarged sectional view of the structure illustrated in Fig. 17, taken on the line 18—18 thereof;

Fig. 19 is an enlarged sectional view of the structure illustrated in Fig. 17, taken on the line 19—19 thereof;

Figure 1:
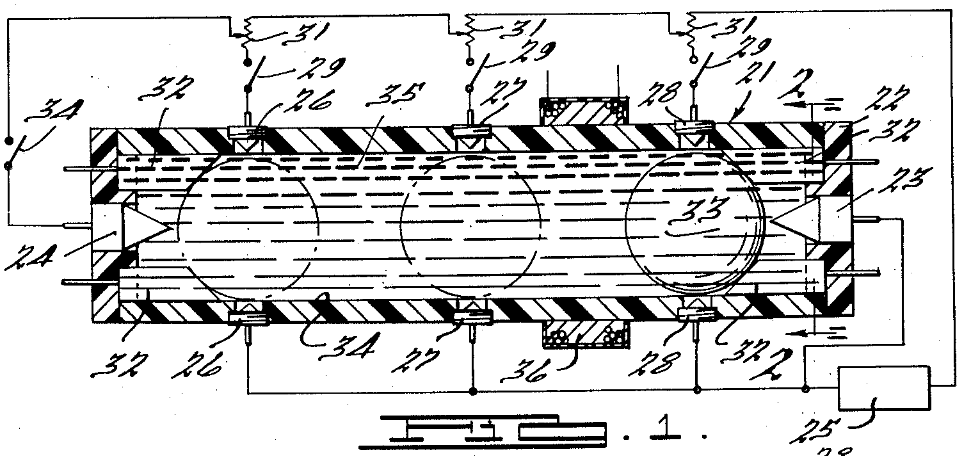
Figure 1 is a sectional view of a device embodying features of the present invention.
Figure 2:
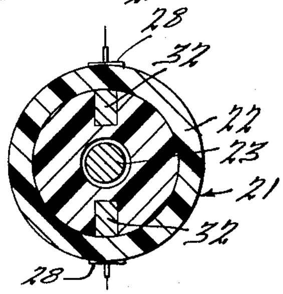
Fig. 2 is a sectional view of the structure illustrated in Fig. 1, taken on the line 2—2 thereof.

In Fig. 1, a control device 21 is illustrated, embodying an insulating housing 22 having at opposite ends electrodes 23 and 24 connected by a circuit to a high potential source 25. The high potential source is also connected to pairs of electrodes 26, 27 and 28 through switches 29 and variable resistors 31. The opposite ends of the device have pairs of contacts 32 which are bridged by a ball 33 which reciprocates from one to the other end of the device within the hollow interior 34 thereof. This structure is somewhat similar to that illustrated, described and claimed in the S. R. Ovshinsky application, Serial No. 655,738, filed April 29, 1957, and assigned to the assignee of the present invention.

In the device of the present invention, the interior 34 of the housing 22 is filled with a dielectric fluid 35 which produces the increased speed of reciprocation of the ball between the ends due to buoyancy of the fluid, the lubrication of the frictional surfaces, and the increased efficiency of the high potential voltage circuit. The dielectric fluid of the devices reduces substantially the chances of arcing between the ball and contacts 32 or the breaking down of the path for the high voltage between the electrodes 23 and 24. As a result, a higher voltage may be utilized between the electrodes or the spacing of the electrodes 23 and 24 may be substantially reduced when employing the same potential. The dielectric fluid plays an extremely important part in the successful operation of the device as it insulates the high potential field in which the ball operates, reducing the chance of a breakdown occurring between the electrodes 23 and 24, contacts 32 and the ball 33, thereby permitting the use of higher potential between the electrodes and the passage of a greater amount of current between the contacts. The buoyancy, lubrication and high efficiency voltage circuit of the liquid produces increased speed of movement of the ball and a more rapid travel from one to the other end of the housing. The speed of movement of the ball may be controlled by the use of liquids of different viscosity and, as a result, an accurate cycle of movement of the ball will occur. Thus, the making and breaking of the circuits through the pairs of contacts 32 may be regulated and through the application of the high potential voltage to the pairs of contacts 26 and 28 the ball may be retained to bridge either set of contacts 32 or it may be stopped in the center by the electrodes 27 to interrupt the circuits through both of the pairs of contacts 32. This control of the ball results from the proper use of the switches 29 and the adjustment of the resistors 31 when the system is energized by the closing of the switch 34. Thus, the device can be employed to make and break circuits momentarily or for a period of time. Through the application of a magnetic field to the device by a coil 36, further uses can be made thereof. For example, the device can control the frequency of output of a generator irrespective of its driven speed. As potential is applied between the electrodes 23 and 24 to produce the reciprocation of the ball, a current may be applied to the coil 36 to produce a magnetic field which dampens the ball movement. The high potential energy derived from the engine operation or from a separate source will produce a reciprocation of the ball at some cycle of operation for a particular speed of the engine. The small portion of the voltage, or the separate source of voltage applied to the coil 36 will produce a magnetic flux which will control the frequency at which the ball will reciprocate between the pairs of contacts 32. A change in engine speed in either an increasing or decreasing sense will not affect the frequency of reciprocation of the ball as the change in the high voltage across the electrodes 23 and 24 will provide a corresponding change in the voltage across the coil 36 and in the magnetic flux produced thereby. The device will function as a digital transducer since it can utilize information from a source, such as temperature, speed, pressure and the like and convert it into an electric current and apply it to the coil 36 to produce a change in frequency of reciprocation of the ball which thereby can have the change indicated in discrete units. This change can be used as a recording means or an error detector in a servo mechanism so as to control the input-output relationship within a given parameter. When a high potential of known value is impressed across the electrodes 23 and 24, the ball 33 will operate at a known frequency. Any means capable of producing a voltage change may be applied to the coil 36 and in this manner the frequency will be correspondingly changed, providing an indication of the change which has taken place. Since such a change can take place either from the change of potential across the electrodes 23 and 24 or a change in the voltage to the coil 36, it can be seen that there is an excellent feed-back connection between the two conditions. The frequency may be changed not only from a change in the voltage to the coil 36 but also a change in the high potential source. Thus, either the high potential voltage or the voltage to the coil may be changed or both may be changed, producing a play of one against the other.

Figure 4:
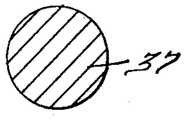
Fig. 4 is a sectional view of a ball employed in the structure illustrated in the foregoing figures.
Figure 5:
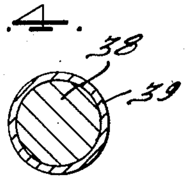
Fig. 5 is a view of a ball, similar to that illustrated in Fig. 4, showing another form thereof.
Figure 6:
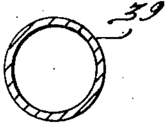
Fig. 6 is a view of a ball, similar to that illustrated in Fig. 4, showing still another form thereof.

The ball may be made of conducting material either solid or hollow, as illustrated in Figs. 4 and 6, or the ball may have a core made of magnetizable material 38 having a layer of conducting material 39 provided thereon, as illustrated in Fig. 5. The ball having the hollow interior, as illustrated in Fig. 6, will be more buoyant and and may be made of either conducting or nonconducting material so long as electric charges may be carried thereby.

Figure 3:
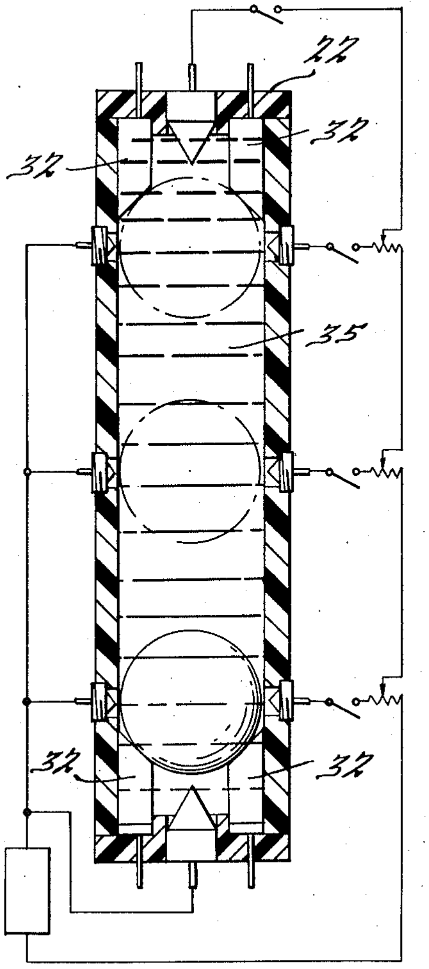
Fig. 3 is a view of the structure, similar to that illustrated in Fig.1, disposed in a vertical position.

A further use of the device is demonstrated by the structure illustrated in Fig. 3, wherein the device of Fig. 1 is disposed in a vertical plane. In this arrangement, the ball will move from the bottom to the top of the housing to complete circuits through the pairs of contacts 32 at a different frequency due to the force of gravity and the buoyant force of the liquid in the presence of the high potential voltage. The ball can be balanced any place within the vertical interior by properly balancing the potential against the gravitational force on the ball. Thus, the reciprocation of the ball may be stopped and can only start when the potential changes from that which balances the ball to maintain it in a static position. Thereupon, the ball will reciprocate at a slow speed if only slightly out of balance. As the applied potential becomes greater and greater from a balanced condition, the reciprocation of the ball will increase in speed. Thus, another control is provided for regulating the degree of reciprocation of the ball within the device. When the dielectric fluid 35 is omitted from the interior of the housing 22, the buoyant force is removed and gravity alone resists the upward movement of the ball.

Figures 7, 8, 9, 26:
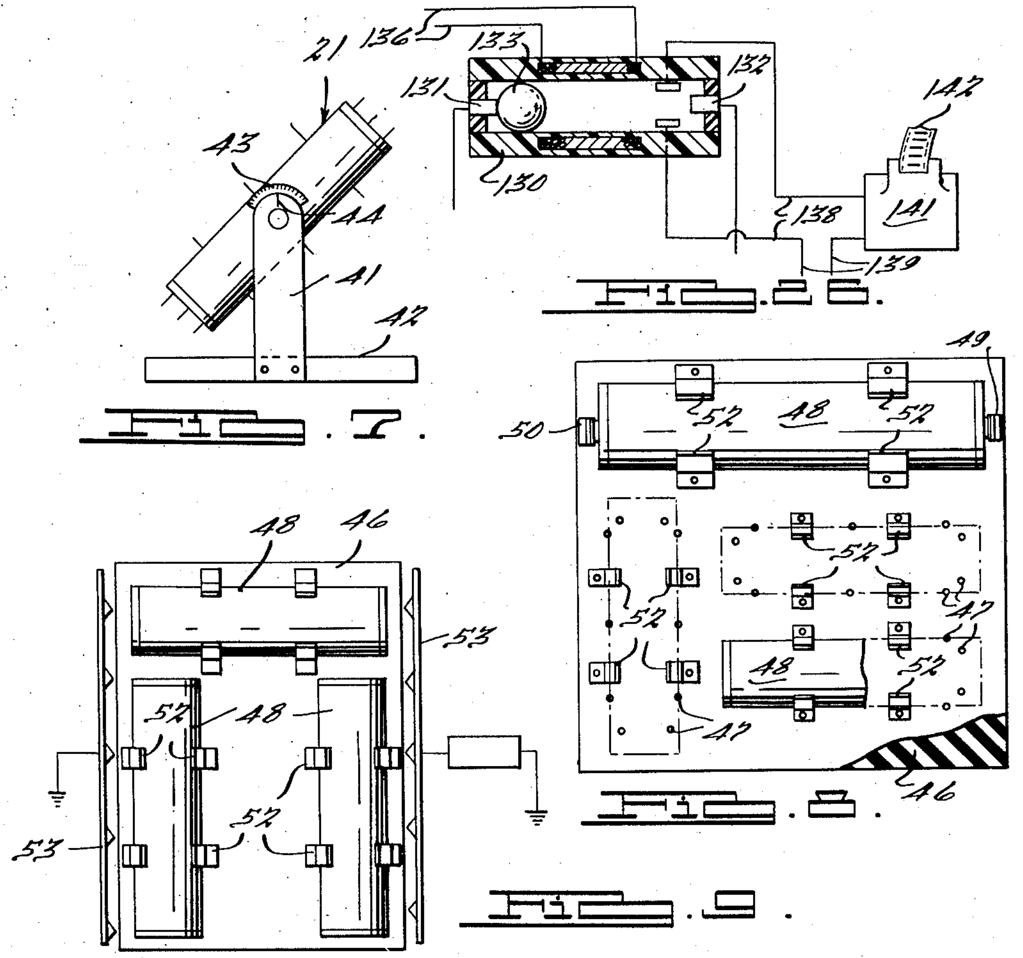
Fig. 7 is a view of structure, similar to that illustrated in Fig. 1, mounted for tilting movement on a support.
Fig. 8 is a view of a panel having a predetermined number of devices of the present invention supported thereon.
Fig. 9 is a view of a panel, similar to that illustrated in Fig. 8, showing a different form thereof.
Fig. 26 is a sectional view of structure, similar to that illustrated in Fig. 1, showing a still further form of the invention.

The change in frequency of movement of the ball when the device is located in the horizontal or vertical plane provides discrete indications of angularity resulting from a change in frequency. In Fig. 7, a device 21 is illustrated as being mounted on a pair of standards 41 supported on a base 42. The angular position of the device 21 is read from an indicator 43 and scale 44. Thus, the device may be set to an angle desired and the base changed in position until the frequency of ball reciprocation reaches the frequency which indicates that the angle has been reached, or the angle of tilt, such as that in an airplane ascending or descending, may be directly indicated through the change in frequency of reciprocation of the ball within the device.

The high potential field may be established in one device in a manner to affect adjacent devices, causing them to operate as if a high optential field were directly applied thereto. In Fig. 8, a panel 46 is illustrated having a circuit of the printed or other type provided with a plurality of contacts 47 which engage contacts of devices 48 which are similar to those illustrated in Fig. 1. The high potential voltage is applied to the electrodes 49 and 50 to produce the oscillation of the ball. The application of the high potential voltage to the electrodes 49 and 50 produces a field across similar electrodes 49 and 50 of the adjacent devices 48 which causes the balls in these other devices to reciprocate from one to the other end thereof in synchronism with the balls of the other devices. Suitable pairs of clips 52 are employed for retaining the devices 48 on the panel.

In Fig. 9, a similar relationship between a plurality of devices is illustrated, wherein a panel 46 has a high potential field disposed thereacross by the spaced electrodes 53 at opposite edges of the panels. The devices 48 are supported by the pairs of clips 52 within the field which will cause the ball 32 thereof to reciprocate back and forth at a predetermined frequency in synchronism with the other devices when the devices are of the same dimension and employ the same size and weight of ball. A variation in frequency will occur in the devices when employing balls of different weight and/or size when operating in a fluid of the same or of different viscosities or in paths of the same or of varying lengths.

Figure 10:
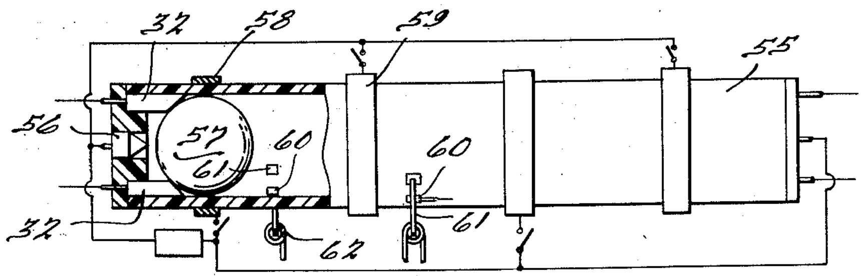
Fig. 10 is a broken sectional view of a device, similar to that illustrated in Fig. 1, showing another form which the invention may assume.
Figure 11:
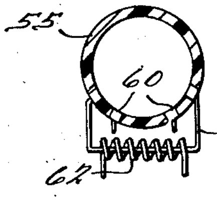
Fig. 11 is a sectional view of the structure illustrated in Fig. 10, taken on the line 11—11 thereof.

In Figs. 10 and 11, a device is illustrated having an insulating housing 55 with the electrodes 56 at opposite ends to which a high potential voltage is applied to produce a field which causes a ball 57 to reciprocate from one to the other end of the device. Pairs of contacts 32 may be mounted at each end of the device through which a circuit is completed when bridged by the ball 57. The speed of reciprocation of the ball may be substantially increased by employing rings 58 and 59 which are alternately disposed along the housing 55, with the positive and negative conductors from a source of high potential connected to alternate rings. Thus, the rings 58 and the right-hand electrode 56 may be said to be receiving voltage of the negative sense, while the left-hand electrode 56 and rings 59 disposed between the rings 58 may be said to be receiving voltage of the positive sense. The difference in potential between the rings 58 and 59 produces the increased speed of movement of the ball and the acceleration thereof is substantially increased as it moves in reciprocation from one to the other end of the housing. Individual switches may be connected in the circuit to each ring to control the movement of the ball between any pair of rings or the stoppage of the ball at any of the rings. Pairs of additional contacts 60 may be spaced along the length of the tube at which the ball 57 may be stopped by a magnetic field set up in the core 61 about which a coil of wire 62 is wound. The application of current to a coil 62 will produce a magnetic field which will stop the ball 57 when made of magnetizable material. Thus, the ball, when reciprocating, will complete circuits for an instant at each end of the housing or for an interval of time when stopped at the ends or at points along the length of the housing, depending upon the field of the rings 58 and 59 and the coils 62. The contacts 60 may have the terminals 26, 27 or 28 disposed adjacent thereto in place of the core 61, energized by a high potential voltage to stop the ball movement at different places along the length of the housing. The core 61, coil 62, or the terminals 26 may be employed at a point within the length of the housing 55 without the pairs of associated contacts 60 so that the ball 57 may be stopped at a point where all of the circuits will be interrupted.

In Figs. 12, 13 and 14, a device is illustrated in which provision is made for permitting the ball to travel in a circuitous path rather than in reciprocation while maintaining similar control of the ball and circuits made and broken thereby. The circular path 77 is mated with an annular slot in an enclosing housing 78 providing a sufficient cross-sectional area to permit a ball 79 to move around the path. The movement of the ball is produced by a high potential voltage applied to a plurality of pairs of electrodes 81 and 82 alternately disposed in the bottom of the path 77 and alternately connected to opposite conductors of a high potential source 80. The field thus provided causes the ball to revolve in the annular path 77 at a frequency depending upon the differential of the high potential fields between the adjacent electrodes 81 and 82. The ball may be stopped at one of several points in the path where a high potential field is set up across sets of electrodes 83. When the ball is stopped in position to engage a set of contacts 84, a circuit is maintained across the conductors 85 which is only instantly completed as the ball is moved thereacross when advancing in the path 77. A magnetic field may be substituted for the high potential field applied to the electrodes 83. A field is produced across the electrodes 83 by a coil 90 wound about a core connected to the electrodes. The magnetic field applied across the electrodes 83 when the coil 90 is energized stops the ball at a point to bridge the contacts 84 when the ball is made of a magnetizable material. Thus, the frequency of the revolution of the ball in the path 77 may be controlled by the potential applied to the electrodes 81 and 82 and the movement of the ball may be dampened or stopped by a potential or magnetic field or fields applied across the path. With this arrangement, a standard frequency may be maintained even though the potential is increased if a proportional increase occurs to the voltage delivered to the coil 90.

In Figs. 15 and 16, a further form of the invention is illustrated, that which results from the revolution of a pair of balls in the path 77. The electrodes 81 and 82 are alternately disposed in the bottom of the path 77 to produce the travel of two or more of the balls therein when subjected to a difference in potential from a source 80. As indicated above with regard to the structure of Figs. 12 and 14, spaced pairs of contacts 88 and 89 are located throughout the length of the path 77 in position to be bridged by the balls as they pass thereacross. Electrodes 83, as illustrated in Figs. 12 and 13 may be disposed adjacent to one or all of the pairs of contacts 88 and 89 to be energized by a voltage source to produce a potential thereacross or by an energizable coil which produces a magnetic field. The balls 79, when of the same size and material, will normally remain out of contact with each other when advanced by the alternate voltage fields produced at the terminals 81 and 82. When a potential field or a magnetic field is applied across a pair of electrodes 83, the next adjacent ball will be stopped to bridge the adjacent pair of contacts and the second or additional balls will catch up and will be stopped by the stopped ball out of engagement with the pairs of contacts or in engagement with pairs of contacts, depending upon the arrangement thereof in the path 77. Thus, for example, if three pairs of contacts are mounted in the path in position to be bridged by the three balls when the pair of electrodes at the forward set of contacts stops the first of the three balls, the following two balls will bridge the second and third pair of contacts so that three circuits are thereby completed. If the electrodes adjacent to the third set of contacts are energized by the signal, then the one ball stopped thereby will bridge the third set of contacts to complete a circuit while the additional two balls will be stopped by the bridging ball out of engagement with any contacts so that a single circuit only is completed. Thus, by applying energy to one or a series of pairs of electrodes to produce a potential or magnetic field therebetween, one or a plurality of circuits may be completed when a plurality of balls and contacts are employed in the device.

A magnetic field may be superimposed about the entire path by an annular coil 91 which will retard the movement of one or a plurality of the balls 79 when made of magnetizable material. This may be employed to cause a magnetizable ball to slow up and retard the advancement of balls made of nonmagnetizable material which may be made of conducting material or have a surface of conducting material applied thereto. When the balls are of different size or made of different material, they may travel at different speeds along the path 77 and all of the balls may be in contact relation to each other as they are advanced in the field so that a plurality of circuits can be made instantly when the foremost ball is stopped by an applied field so that all of the balls may bridge the pairs of contacts spaced rearwardly thereof a distance equal to the diameter of the ball. By employing a plurality of balls, the time interval for completing a circuit upon the reception of a signal is shortened as the closest ball advancing toward the contacts will produce the bridging thereof which may be less than one-third of the length of the path when two or three balls are employed. When a single ball is utilized, the travel of the entire path may be necessary to advance the ball to the electrodes at which the signal is received.

In Figs. 17, 18 and 19, a still further form of the invention is illustrated, that wherein a rotatable hub 121 carries a plurality of insulating spokes 122 on the ends of which chargeable elements 123 are supported. The elements 123 are disposed adjacent to the inner periphery of a ring 124 which is preferably made of insulating material, having therein electrodes 125 and 126. The electrodes 125 are alternately disposed relative to the electrodes 126 and are connected in a high potential circuit so as to have a negative charge, while the electrodes 126 are connected to the circuit in a manner to have a positive charge. The attracting and repelling forces occur between the chargeable elements 123 and the electrodes in the same manner as occurred to the ball 79 in the trackway 77 to cause the spindle 121 to rotate, to thereby advance the chargeable elements along the inner periphery of the ring 124. Contacts 127 may be disposed in the path of the elements 123 so as to be bridged thereby to complete a circuit through the conductors 128. Pairs of the contacts may be bridged simultaneously by different of the elements 123 in the lower half of the ring 124 or the contacts 127 located near the top of the device may be separately bridged. A set of terminals 129 may be employed for receiving a voltage from a source for applying a field to one of the elements 123, to thereby stop the rotation of the spindle 121. This stoppage can occur to bridge the two sets of lower contacts 127 when the upper terminals 129 are energized or to stop the spindle and elements, with the upper contacts 127 bridged when the lower set of terminals 129 are energized. The terminals 129 may be the ends of pole pieces having a coil 90 associated therewith, similar to that illustrated in Fig. 14, to have a magnetic flux stop the rotation of the spindle and elements when a circuit to be maintained completed when the contacts 127 are bridged. Thus, a voltage signal may be applied to the upper set of terminals 129 and a magnetic flux applied to the bottom terminals 129 which act as pole pieces for interrupting the rotation of the spindle 121 and the elements 123.

In Fig. 18, a modified form of the device illustrated in Fig. 17 is shown, that wherein the elements 123 extend through the hollow interior 131 of terminals 132 which are of C shape. A weak voltage signal applied to the terminals will produce the rotation of the hub 121 and the elements 123 which would not be strong enough to produce the rotation of the structure illustrated in Fig. 17. It is to be understood that the terminals 132 are of alternate polarity when disposed about the ring 124, as illustrated in Fig. 17.

In Fig. 19, a further form of structure is illustrated, that wherein the ring is reduced in diameter and the terminals 125 and 126 are mounted directly beneath the elements 123 rather than in the extension of the ends thereof, as illustrated in Fig. 17. The device, however, operates in the same manner as that of Figs. 17 and 18 above described.

Figure 20:
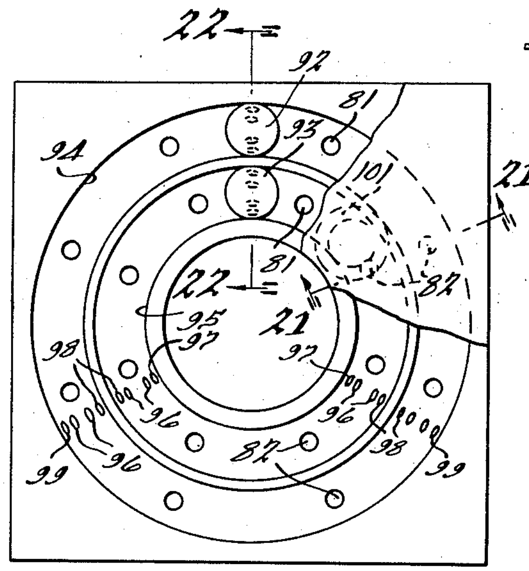
Fig. 20 is a plan view of structure in which a plurality of balls operate in separate annular paths disposed adjacent to each other.
Figure 21:
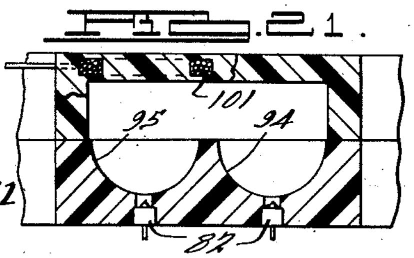
Fig. 21 is an enlarged sectional view of the structure illustrated in Fig. 20, taken on the line 21—21 thereof.
Figure 22:
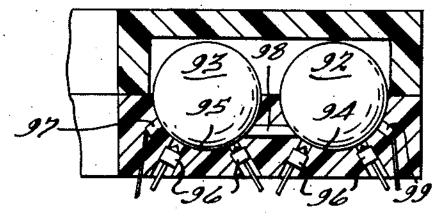
Fig. 22 is an enlarged sectional view of the structure illustrated in Fig. 20, taken on the line 22—22 thereof.

In the devices illustrated in Figs. 20, 21 and 22, a pair of like balls 92 and 93 operate in adjacent circular paths 94 and 95, respectively. Electrodes 81 and 82 are provided in the paths for establishing the alternate high potential fields of opposite polarities in a manner discussed above. The balls will revolve in the circular paths at different speeds due to the difference in lengths of the paths when the same potential fields are employed in both paths and at the same speed if the potentials differ in a related sense. The balls may be stopped in their revolutions in the paths by a high potential field applied thereacross by electrodes 96. The stopping of the two balls by the pairs of electrodes 96 will complete a circuit through contacts 97, 98 and 99 in the bottom portion of the paths 94 and 95. The relative speed of rotation of the balls in the different lengths of the paths will produce the periodic timing when the balls will line up, as illustrated in Figs. 20 and 22, with the contacts 97, 98 and 99 engaged to complete a circuit, thereby indicating the harmonic motion which is produced thereby. Such a harmonic motion may be varied through a change in the applied potential or the application of a magnetic coil 101 to a portion of one or both of the paths. The potential or magnetic field may be applied at any of the sets of contacts 97, 98 and 99 to complete and maintain a circuit by stopping the balls, and if stopped at a point where there are no contacts, all of the circuits will remain interrupted.

Figure 23:
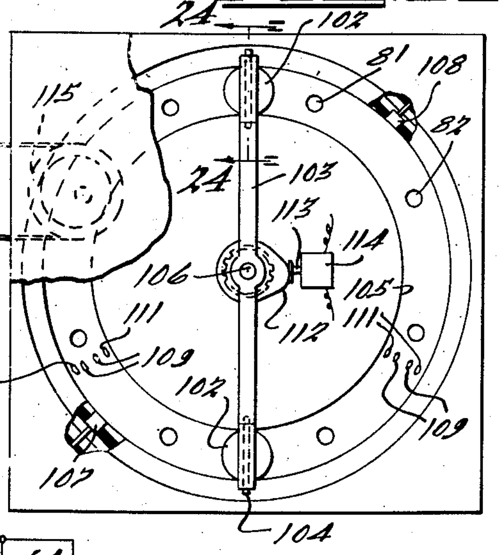
Fig. 23 is a plan view of structure, similar to that illustrated in Fig. 17, showing another form which the invention may assume.
Figure 24:
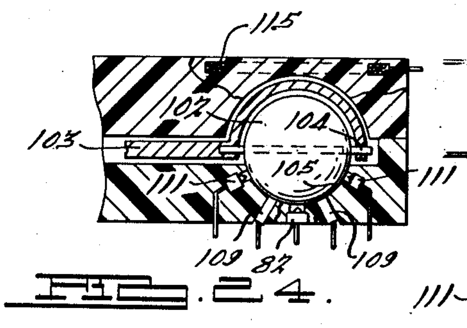
Fig. 24 is an enlarged sectional view of the structure illustrated in Fig. 23, taken on the line 24—24 thereof.

In Figs. 23 and 24, a still further form of the invention is illustrated, that wherein a pair of balls 102 is mounted at the ends of a centrally pivoted arm 103 by means of a shaft 104. The ball rolls in a path 105 on the shafts 104 of the arms under the influence of the high potential fields produced by the electrodes 81 and 82 which are alternately disposed and energized to be of opposite polarities. The rotation of the balls can complete a circuit through contacts 107 and 108 at opposite sides of the path through the arm 103 if of conducting material. If not, the ball itself can complete a circuit through adjacent contacts 109 when passing thereover or when stopped by a separate high potential field produced through the energization of electrodes 111. The arm 103 may carry a cam 112 which could perform work, herein illustrated as operating a plunger 113 of a switch 114. The cycle of revolution of the arm 103 may be controlled by a magnetic field applied through a coil 115. The energization of the coil may be played against the high potential fields applied to the electrodes 81 and 82 to thereby control the movement of the arm 103 or to stop its movement. A sufficiently strong field may be provided by the coil 115 through the application of voltage thereto which would prevent the balls from advancing in the path 105. The increase of potential to the electrodes 81 and 82 or a decrease in voltage to the coil 115 would permit the advancement of the ball to complete the circuits, operate a switch, or drive a worm or other type of gearing or other device, as pointed out hereinabove.

The high potential voltage may be of the D.C. or A.C. type for producing the charges on the balls and a difference in potential across the electrodes 81 and 82 to cause the balls to advance in the path. When an A.C. current of a high potential source is employed, the frequency of movement of the ball will be a harmonic of the frequency of the A.C. applied potential and may be used for the purpose of rectification of the A.C. current, as disclosed in the above mentioned copending application.

Figure 25:
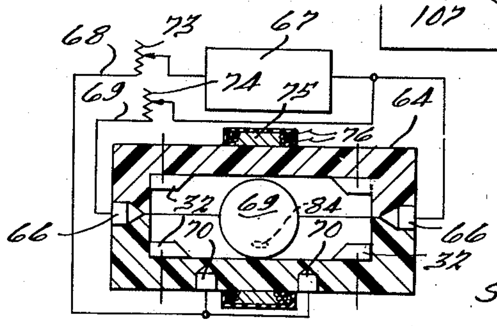
Fig. 25 is a sectional view of structure, similar to that illustrated in Fig. 1, showing a further form of the invention.

In Fig. 25, a further form of the device is illustrated, that wherein a housing 64 contains a ball 65 which moves between electrodes 66 at each end of the housing. A source of high potential voltage 67 is connected to the electrodes 66 by a circuit 68 to have the electrodes energized in a positive sense. A circuit 69 from the source 67 produces a high potential voltage in a negative sense to the electrodes 71 adjacent to the center of the device. The ball may be maintained in a central position if a balanced circuit is provided and this would result in the use of proper resistance in the circuit, such as shown at 73 and 74. Should the circuit become unbalanced through a change of resistance, potential, or both, the ball would move to the left or right of center and oscillate between center and one of the electrodes 66. A coil 75 may be wound about the central portion of the housing 64, the terminal ends 76 of which would be connected into a source of low voltage to produce a magnetic field which would attract the ball, if of magnetizable material, in its movement from an electrode 66 with sufficient force to have it travel beyond center into the influence of the potential field of the electrode 66 at the opposite end of the housing. The ball will continue to reciprocate between the electrodes 66 at a speed controlled by the strength of the magnetic field. The device could be used as a digital transducer by producing an indication through a change in frequency of reciprocation of the ball due to changes in potential on the electrodes 66 and 71 and/or of voltage applied to the coil 75. The device could be used as an error detector for balancing the input potential to the electrodes 66 against that applied to the electrodes 71.

Referring to Fig. 26, an arrangement is illustrated for controlling a pulsing circuit to give direct information from a signal so that the device functions as a digital transducer. In the device, a housing 130 has terminals 131 and 132 at opposite ends for producing a movement in reciprocation to a ball 133 from one to the other end of the hollow interior of the housing. In the central part of the housing a coil 134 is mounted which is energized from a signal in a circuit 136 to produce a magnetic field of a corresponding order along the central portion of the path traversed by the ball. A pair of contacts 137 at the right-hand end of the housing, as illustrated in the figure, is bridged by the ball 133 when at the right-hand end of the housing, to thereby complete a circuit 138 from a source 139 to a device 141 which responds to the pulse delivered thereto each time the ball bridges the contacts 137. Through the application of an applied voltage to the terminals 131 and 132, the ball 133 reciprocates at an exact cycle and provides pulses to the device 141 to secure its operation. The object of this unit is to transform continuous values, such as temperature, speed, pressure and the like in the form of input impulses into changing values from a sensing unit which, by varying the current in a surrounding coil modulates the ball activity so that discrete output changes in frequency can be recorded or utilized in a discrete manner. Thus, for example, when temperature is to be accurately recorded or gauged, the reciprocation of the ball can be set for a predetermined temperature and a change in speed of reciprocation, either greater or smaller, can be utilized for showing either an increase or decrease in the temperature. Any device responsive to temperature change which produces a change in voltage may be employed in the circuit 136 to change the strength of the magnetic field corresponding to the change of temperature. This change in the magnetic field retards or accelerates the movement of the ball and provides a discrete number on an applicable scale, tape 142 or the like which directly indicates the changed temperature.

Pairs of contacts 32 may be applied at the opposite ends of the housing 64 and a similar set of contacts 32 may be applied at the center of the housing in the lower part thereof to be bridged by the ball when maintained in the center of the device. It will be noted in the various figures that the terminals, such as terminals 66 of Fig. 25, have pointed ends, as it was found that the shape of the electrodes can substantially vary the potential level. As the ends are made sharper and sharper, it was found that less and less potential need be applied across the terminals to produce the same movement of the ball. When the magnetic field is applied to the static field which produces the movement of the ball, the ball may be stopped or its movement may be retarded or accelerated, depending upon the relation between the fields.

While nothing has been specifically mentioned concerning the use of the dielectric fluid in all of the devices hereinabove described, it is to be understood that the use of such fluid has many advantages and in most instances will be employed. It has been pointed out hereinabove that the dielectric fluid produces buoyancy, lubrication, and a more efficient circuit, permitting the ball to increase its speed of movement when speed is desired. The fluid permits the use of higher voltages and currents without damage to the terminals, electrodes, contacts, the surface of the ball or the like, and the length of the path between the high potential terminals may be substantially shortened due to the presence of the dielectric liquid. The movement of the ball in the dielectric liquid provides a more efficient electric circuit with less leakage and less applied energy is required to obtain the maximum control of the ball.

When the word "ball" is employed throughout the specification and claims, it is to be understood that a true spherical element is not necessarily referred to since the element may be of any shape and may be in some instances a plurality of sizable elements or a greater number of small elements in the nature of chargeable particles which may be compacted to produce a conductive path. Thus, the chargeable means, whether a sphere or an irregular element or elements or those which have been previously charged, will be affected by the charge applied by the difference of potential across the electrodes to change the conductivity across a pair of contacts, as herein disclosed. It is also to be understood that the elements and particles can be magnetic, conductive, or nonconductive since they will be affected by this difference of potential across the electrodes to be moved in a manner to change the conductivity of a path, as hereinabove described. This change of state of the variable material of the device will change the degree of conductivity of a path to interrupt or complete a circuit, as the case may be.

What is claimed is:

1. An electric control device embodying a housing having an internal chamber, a ball within said chamber, terminals on opposite ends of said housing for connection to a voltage source which provides a difference in potential thereacross and produces an electrostatic force that causes the reciprocation of the ball from one to the other end of the housing, contacts at the ends of the device which are bridged by the ball to complete a circuit when at said ends, and a plurality of conductors disposed across the housing and connectible to a voltage source for providing a field which interrupts the movement of the ball and maintains it in bridged engagement with the contacts which are adjacent to the conductors located at one end of the housing.

2. An electric control device embodying a housing having an internal chamber, a ball within said chamber, terminals on opposite ends of said housing for connection to a voltage source which provides a difference of potential thereacross and produces the reciprocation of the ball from one to the other end of the housing, contacts at the ends of the device which are bridged by the ball to complete a circuit when at said ends, a dielectric liquid within said chamber providing a buoyant force to the ball and insulation for the chamber, and a plurality of conductors disposed across the housing and connectible to a voltage source for providing an electrostatic force which interrupts the movement of the ball and maintains it in bridged engagement with the contacts which are adjacent to the conductors located at one end of the housing.

3. An electric control device embodying a housing having an internal chamber, a ball within said chamber, terminals on opposite ends of said housing for connection to a voltage source which provides a difference in potential thereacross and produces the reciprocation of the ball from one to the other end of the housing, contacts at the ends of the device which are bridged by the ball to complete a circuit when at said ends, a dielectric liquid within said chamber providing a buoyant force to the ball and insulation for the chamber, a plurality of conductors diametrically disposed across the housing and capable when connected to a voltage source of producing an electrostatic field for interrupting the movement of the ball and maintaining it in bridged engagement with the adjacent contacts and for holding the ball out of engagement with either set of contacts when said conductors are spaced therefrom, and a coil about said housing the magnetic field from which interrupts the movement of the ball when current is applied thereto for stopping said ball when the ball is made of magnetizable material.

4. An electric control device embodying a housing having an internal chamber, a ball within said chamber, terminals on opposite ends of said housing for connection to a voltage source which provides a difference in potential thereacross and produces the reciprocation of the ball from one to the other end of the housing, contacts at the ends of the device which are bridged by the ball to complete a circuit when at said ends, a dielectric liquid within said chamber providing a buoyant force to the ball and insulation for the chamber, a plurality of conductors diametrically disposed across the housing and providing an electrostatic force when energized for interrupting the movement of the ball and maintaining it in bridged engagement with a pair of said contacts when located adjacent thereto and for holding the ball out of engagement with either pair of contacts when retained stationary at a point remote from said contacts, and a coil about said chamber into which a current is induced when a ball of magnetizable material is reciprocated within the chamber.

5. An electric control device embodying a housing having an internal chamber, a ball within said chamber, terminals on opposite ends of said housing for connection to a voltage source which provides a difference in potential thereacross and produces the reciprocation of the ball from one to the other end of the housing, contacts at the ends of the device which are bridged by the ball to complete a circuit when at said ends, a dielectric liquid within said chamber providing a buoyant force to the ball and insulation for the chamber, and a coil about said chamber into which a current is induced when a ball of magnetizable material is reciprocated within the chamber.

6. An electric control device embodying a housing having an internal chamber, a ball within said chamber, terminals on opposite ends of said housing for connection to a high potential voltage source which produces the reciprocation of the ball from one to the other end of the housing, contacts at the ends of the device which are bridged by the ball to complete a circuit at said ends, a dielectric liquid within said chamber providing a buoyant force to the ball and insulation for the chamber, and a coil about said chamber in which charges of alternate polarity from the ball are introduced as the ball reciprocates within the chamber and is charged with an opposite polarity at each end of the chamber.

7. An electric control device embodying a housing having an internal chamber, a ball within said chamber, terminals on opposite ends of said housing for connection to a voltage source which provides a difference in potential thereacross and produces an electrostatic force that causes the reciprocation of the ball from one to the other end of the housing, contacts at the ends of the device which are bridged by the ball to complete a circuit when at said ends, and a dielectric liquid within said chamber providing a buoyant force and a lubricant for the ball and insulation for the chamber, the speed of reciprocation of said ball in the presence of a voltage across the terminals depending upon the angularity of said chamber.

8. In a device for controlling a circuit, a housing having an internal chamber, chargeable means within said chamber, electrodes associated with the chamber for causing the chargeable means to travel therein, a dielectric liquid within the chamber which increases the speed of travel of the chargeable means and the degree of insulation within the chamber, contact means within the path of travel of said chargeable means which is bridged thereby to complete a circuit, and means adjacent to the contact means for interrupting the travel of the chargeable means and maintaining the chargeable means bridged across said contacts.

9. In a device for controlling a circuit, a housing having an internal chamber, a ball within said chamber, electrodes associated with the chamber producing electrostatic forces for causing the ball to travel therein, a dielectric liquid within the chamber which increases the speed of travel of the ball and the degree of insulation within the chamber, contact means within the path of travel of said ball which is bridged thereby to complete a circuit, and means adjacent to the contact means for interrupting the ball's travel and maintaining the ball bridged across said contacts, said chamber being of continuous annular configuration and said electrodes being alternately disposed to provide fields of opposite polarities which produce the advancement of the ball.

10. In a device for controlling a circuit, a housing having an internal chamber, a ball within said chamber, electrodes associated with the chamber producing electrostatic forces for causing the ball to travel therein, a dielectric liquid within the chamber which increases the speed of travel of the ball and the degree of insulation within the chamber, contact means within the path of travel of said ball which is bridged thereby to complete a circuit, means adjacent to the contact means for interrupting the ball's travel and maintaining the ball bridged across said contacts, said chamber being of continuous annular configuration and said electrodes being alternately disposed to provide fields of opposite polarities which produce the advancement of the ball, and a second ball within said annular chamber.

11. In a device for controlling a circuit, a housing having an internal chamber, a ball within said chamber, electrodes associated with the chamber producing electrostatic forces for causing the ball to travel therein, a dielectric liquid within the chamber which increases the speed of travel of the ball and the degree of insulation within the chamber, contact means within the path of travel of said ball which is bridged thereby to complete a circuit, means adjacent to the contact means for interrupting the ball's travel and maintaining the ball bridged across said contacts, said chamber being of continuous annular configuration and said electrodes being alternately disposed to provide fields of opposite polarities which produce the advancement of the ball, a second ball within said chamber, and signal means for controlling the rate of movement and the stopping of the balls comprising fields produced by a difference in potential or a magnetic flux or both.

12. In a circuit control device, a housing having a chamber therewithin, a partition dividing said chamber into two parts, a ball in each of said chamber parts, a contact at one end of the chamber in each of said parts, terminals for producing the movement of one of the balls into engagement with one of the contacts when a voltage signal is applied to said terminals, and magnetizable means for moving the other ball into engagement with the other contact and with the first said ball when an energy signal is applied thereto to thereby complete a circuit across said contacts through both of said balls.

13. In a circuit control device, a housing having a continuous annular path, a ball within said path, terminals within said path for producing electrostatic forces and causing the advancement of said ball therein, contacts within said path completing a circuit when bridged by the advancement of said ball, and means within said path for maintaining said ball in bridging relation with said contacts for maintaining a circuit for a desired length of time.

14. In a circuit control device, a housing having a continuous annular path, a ball within said path, terminals within said path for producing electrostatic forces and causing the advancement of said ball therein, contacts within said path completing a circuit when bridged by the advancement of said ball, and means within said path for maintaining said ball in bridging relation with said contacts for maintaining a circuit for a desired length of time, said maintaining means being a magnetic field when the ball is made of magnetizable material.

15. In a circuit control device, a housing having a continuous annular path, a ball within said path, terminals within said path for producing electrostatic forces and causing the advancement of said ball therein, contacts within said path completing a circuit when bridged by the advancement of said ball, and means within said path for maintaining said ball in bridging relation with said contacts for maintaining a circuit for a desired length of time, said means producing an electrostatic field which maintains the ball bridged across the contacts.

16. In a device for controlling electric circuits, a housing, a hub rotatable in said housing, spokes extending from said hub, chargeable elements on the ends of said spokes, and terminals in said housing adjacent to said chargeable elements alternately connected to a voltage source so as to be of opposite polarity to cause said elements and hub to rotate.

17. In a device for controlling electric circuits, a housing, a hub rotatable in said housing, spokes extending from said hub, chargeable elements on the ends of said spokes, terminals in said housing adjacent to said chargeable elements alternately connected to a voltage source so as to be of opposite polarity to cause said elements and hub to rotate, contacts bridged by said elements to complete an electric circuit, and conductors responsive to an electric force for stopping the advancement of said hub and maintaining an element bridged across a set of the contacts.

18. In a device for controlling electric circuits, a housing, a hub rotatable in said housing, spokes extending from said hub, chargeable elements on the ends of said spokes, terminals in said housing adjacent to said chargeable elements alternately connected to a voltage source so as to be of opposite polarity to cause said elements and hub to rotate, contacts bridged by said elements to complete an electric circuit, and conductors responsive to an electric force for stopping the advancement of said hub for maintaining an element bridged across the contacts.

19. In a device for controlling a circuit, a housing having an internal chamber, a terminal at each end of the housing, spaced terminals in one side of the housing, circuits connecting the end terminals to a voltage source in a manner to provide each with the same polarity, a circuit connecting the terminals in the one side of the housing to the voltage source to provide each with the same polarity which is opposite to that of the end terminals, and a ball within the chamber responsive to an electric field for interrupting a circuit when maintained in the center of the chamber and for completing a circuit when the ball is held at one or the other end of the chamber.

20. In a device for controlling a circuit, a housing having an internal chamber, a terminal at each end of the housing, spaced terminals in one side of the housing, circuits connecting the end terminals to a voltage source in a manner to provide each with the same polarity, a circuit connecting the terminals in the one side of the housing to the voltage source to provide each with the same polarity which is opposite to that of the first terminals, and a ball within the chamber responsive to an electric field for interrupting a circuit when maintained in the center of the chamber and for completing a circuit when holding the ball at one or the other end of the chamber, said electric field being of the magnetic type for holding the ball when the ball is made of magnetizable material.

References Cited in the file of this patent

UNITED STATES PATENTS

| | | |
|---|---|---|
| 767,599 | Sedgwick et al. | Aug. 16, 1904 |
| 1,805,021 | Somersgale et al. | May 12, 1931 |
| 2,254,589 | Aamodt | Sept. 2, 1941 |
| 2,339,063 | Deakin | Jan. 11, 1944 |
| 2,369,296 | Irwin et al. | Feb. 13, 1945 |
| 2,601,142 | Hubbard | June 17, 1952 |
| 2,732,464 | Ohl | Jan. 24, 1956 |
| 2,794,178 | Reynolds | May 28, 1957 |
| 2,833,882 | Valehrach | May 6, 1958 |